(12) United States Patent
Liu (10) Patent No.: US 12,335,071 B2
(45) Date of Patent: Jun. 17, 2025

(54) DECISION FEEDBACK EQUALIZER

(71) Applicant: REALTEK SEMICONDUCTOR CORPORATION, Hsinchu (TW)

(72) Inventor: Yao-Chia Liu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 26 days.

(21) Appl. No.: 18/418,392

(22) Filed: Jan. 22, 2024

(65) Prior Publication Data

US 2024/0267265 A1 Aug. 8, 2024

(30) Foreign Application Priority Data

Feb. 3, 2023 (TW) ................. 112103937

(51) Int. Cl.
*H04L 25/03* (2006.01)

(52) U.S. Cl.
CPC .. *H04L 25/03057* (2013.01); *H04L 25/03267* (2013.01); *H04L 25/03885* (2013.01)

(58) Field of Classification Search
CPC ......... H04L 25/03057; H04L 25/03267; H04L 25/03885
USPC ....................................................... 375/267
See application file for complete search history.

(56) References Cited

U.S. PATENT DOCUMENTS

| | | | |
|---|---|---|---|
| 7,869,498 B2 | 1/2011 | Zeng et al. | |
| 9,350,572 B1 * | 5/2016 | Kang | ............ H04L 7/033 |
| 9,794,089 B2 * | 10/2017 | Musah | ............ H04L 7/0087 |
| 10,097,383 B1 | 10/2018 | Bulzacchelli et al. | |
| 2016/0241421 A1 | 8/2016 | Lim et al. | |
| 2017/0005785 A1 * | 1/2017 | Aleksic | ............ H04L 7/033 |
| 2017/0295039 A1 * | 10/2017 | Hidaka | ............ H04L 25/03267 |

OTHER PUBLICATIONS

OA letter of a counterpart TW application (appl. No. 112103937) mailed on Sep. 7, 2023. Summary of the TW OA letter issued according to the TW counterpart application: (1) Claim 1 is rejected as being unpatentable over the cited reference 1 (U.S. Pat. No. 10,097,383B1) in view of the cited reference 2 (US 2016/0241421A1). P.S. Correspondence between the claims of the TW counterpart application and the claims of the present US application: (1) Claims 1~10 of the TW counterpart application are corresponding to the claims 1~10 of the present US application respectively.

* cited by examiner

*Primary Examiner* — Leila Malek
(74) *Attorney, Agent, or Firm* — WPAT, PC (57) ABSTRACT

A decision feedback equalizer includes an adder, a comparison device, a register, and a decision feedback coefficient (DFC) generator. The comparison device includes N data comparator(s), each of which includes a feedback compensation circuit, an input-stage circuit, a gain-stage circuit, and a latch in sequence. The feedback compensation circuit determines a degree of compensation according to feedback coefficients from the DFC generator and feedback compensation bits from the N data comparator(s), so that the input-stage circuit, the gain-stage circuit, and the latch can process an analog input signal from the adder according to the degree of compensation and thereby output a data comparison result to the register. The DFC generator determines the feedback coefficients according to the data comparison result.

10 Claims, 10 Drawing Sheets

DECISION FEEDBACK EQUALIZER

BACKGROUND OF THE INVENTION

1. Field of the Invention

The present disclosure relates to an equalizer, especially to a decision feedback equalizer.

2. Description of Related Art

Figure 1:
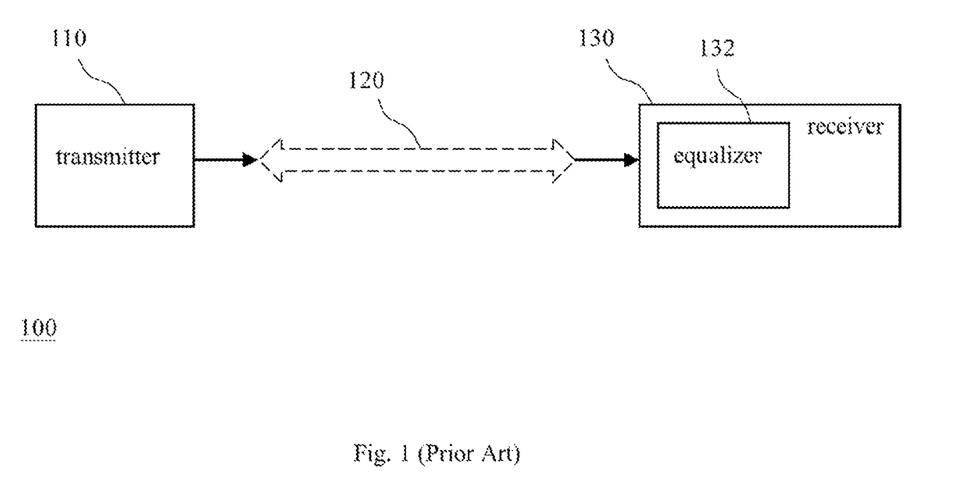
FIG. 1 shows a general transceiver system.

FIG. 1 shows a general transceiver system 100. The transceiver system 100 includes a transmitter 110, a channel 120 (e.g., a fiber channel or another kind of wired channels), and a receiver 130. When the receiver 130 receives data from the transmitter 110 via the channel 120, the receiver 130 processes the data with an equalizer 132 to compensate for (or cancel) the channel effect caused by the channel 120. The channel effect includes an inter-symbol interference (ISI) which implies that a current transmission signal is influenced by a previous transmission signal and/or a following transmission signal due to multipath propagation and/or bandlimited channel features. The equalizer 132 usually includes a decision feedback equalizer (DFE) to cancel the ISI efficiently.

Generally, the design of the equalizer 132 is hard to take both the complexity and the efficiency in canceling the ISI into consideration, and therefore how to realize an uncomplicated and highly efficient equalizer 132 is an issue to be solved.

SUMMARY OF THE INVENTION

An object of the present disclosure is to provide a decision feedback equalizer (DFE) that can be applied to a high-speed receiver.

An embodiment of the DFE of the present disclosure includes an analog adder, a comparison device, a register, a decision feedback coefficient generator, and a digital-to-analog converter (DAC). The analog adder is configured to generate an analog input signal according to an analog received signal and an analog feedback signal. The comparison device includes N data comparator(s), wherein the N is a positive integer. Each of the N data comparator(s) includes: a data comparison feedback-compensation circuit configured to output a data comparison feedback-compensation signal to a first group of node(s) according to M data comparison feedback-compensation bit(s) and a data comparison feedback-compensation current, wherein the M is a positive integer and the data comparison feedback-compensation current is dependent upon a data comparison feedback coefficient; a data comparison input-stage circuit configured to output a data comparison sampling signal to the first group of node(s) according to the analog input signal under the control of a first clock so that the signal(s) of the first group of node(s) include(s) the data comparison feedback-compensation signal and the data comparison sampling signal; a data comparison gain-stage circuit configured to output a data comparison amplified signal to a second group of node(s) according to the signal(s) of the first group of node(s) under the control of a second clock, wherein the second clock and the first clock have the same frequency but different phases; and a data comparison storage circuit configured to output a data comparison result according to the signal(s) of the second group of node(s). The register is coupled with the comparison device, and configured to temporarily store the data comparison result. The decision feedback coefficient generator is coupled with the register, and configured to determine the data comparison feedback coefficient and an analog-to-digital conversion feedback coefficient according to the data comparison result. The DAC is coupled with the decision feedback coefficient generator and the register, and configured to convert the data comparison result into the analog feedback signal according to the analog-to-digital conversion feedback coefficient.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a decision feedback equalizer (DFE) including at least one of the following features: allowing an analog addition operation and a data comparison operation to be performed simultaneously and thereby relaxing the limitation on the time of the provision of a first piece of feedback data; avoiding using an analog adder with high power consumption; using a small current to perform feedback compensation; and optimizing feedback coefficient(s) for a data comparator and feedback coefficient(s) for a data-edge comparator, respectively.

Figure 2:
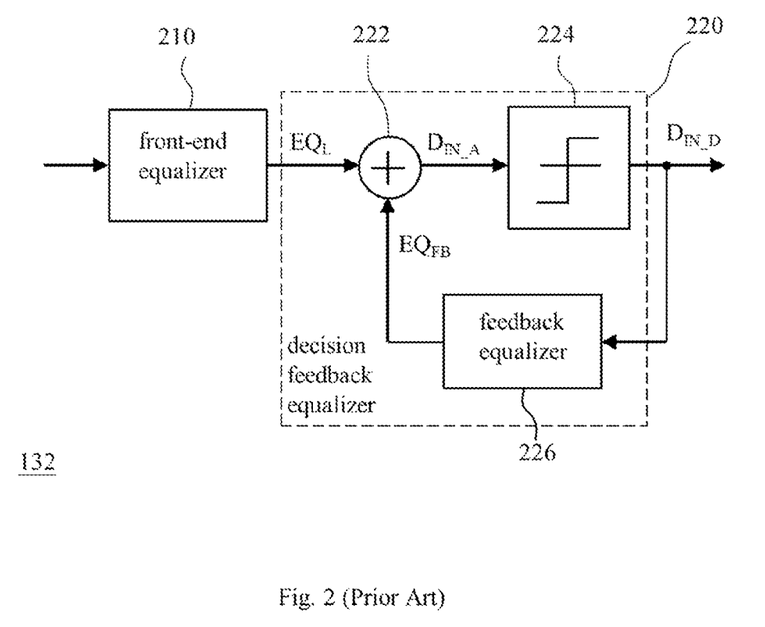
FIG. 2 shows an embodiment of the equalizer of FIG. 1.

FIG. 2 shows an embodiment of the equalizer 132 of FIG. 1. This embodiment includes a front-end equalizer 210 (e.g., a linear equalizer) and a DFE 220. The front-end equalizer 210 can cancel a pre-cursor inter-symbol interference (pre-cursor ISI) while the DFE 220 can cancel a post-cursor ISI. The DFE 220 includes an analog adder 222, a data comparator 224, and a feedback equalizer 226. The analog adder 222 generates analog data $D_{IN\_A}$ according to an output $EQ_L$ from the front-end equalizer 210 and a feedback $EQ_{FB}$ (i.e., the compensation for the present transmission signal) from the feedback equalizer 226. The data comparator 224 generates digital data $D_{IN\_D}$ according to the analog data $D_{IN\_A}$. The feedback equalizer 226 generates the feedback $EQ_{FB}$ according to the digital data $D_{IN\_D}$. The first piece of feedback $EQ_{FB}$ should be fed back within a present data cycle so as to cancel the ISI of the second piece of the analog data $D_{IN\_A}$, which implies that a sum of a delay caused by the data comparator 224, a delay caused by the feedback equalizer 226, and a delay caused by the analog adder 222 should be shorter than a cycle of a data clock $CK_{DATA}$ of the analog data $D_{IN\_A}$. The above-mentioned requirements are hard to be achieved in an application of high-speed transmission.

Figure 3:
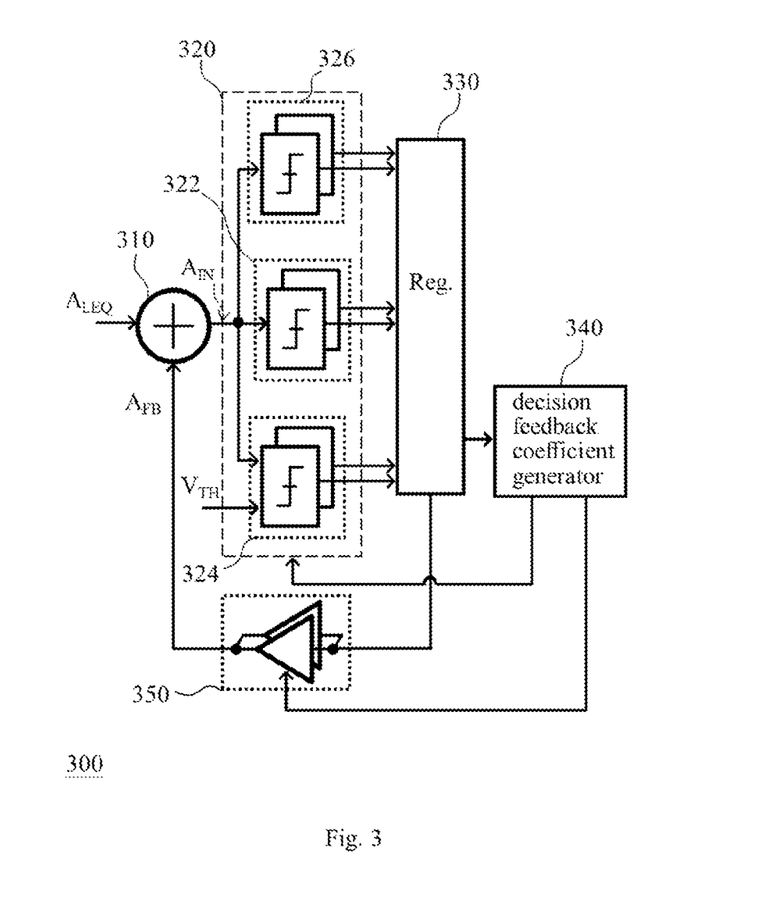
FIG. 3 shows an embodiment of the decision feedback equalizer of the present disclosure.

FIG. 3 shows an embodiment of the DFE of the present disclosure. The DFE 300 of FIG. 3 includes an analog adder 310, a comparison device 320, a register (Reg.) 330, a decision feedback coefficient generator 340, and a digital-to-analog converter (DAC) 350. These circuits are described in detail in the following paragraphs, respectively.

The analog adder 310 is configured to generate an analog input signal $A_{IN}$ according to an analog reception signal $A_{LEQ}$ and an analog feedback signal $A_{FB}$. The analog reception signal $A_{LEQ}$ may be from a front-end equalizer (not shown in FIG. 3) such as a linear equalizer, but the present invention is not limited thereto. In this specification, each of the analog reception signal $A_{LEQ}$, the analog feedback signal $A_{FB}$, and the analog input signal $A_{IN}$ is a differential signal, which implies that the configuration of the DFE 300 is suitable for processing the differential signal. However, those having ordinary skill in the art can appreciate how to modify the configuration of the DFE 300 to make it suitable for processing a single-ended signal.

The comparison device 320 includes N data comparator(s) 322, N' amplitude comparator(s) 324, and N data-edge comparator(s) 326, wherein each of the N and the N' is a positive integer, and the N' is equal to or smaller than the N (e.g., N'=N or $$N' = \frac{N}{2}\bigg).$$

Figure 4:
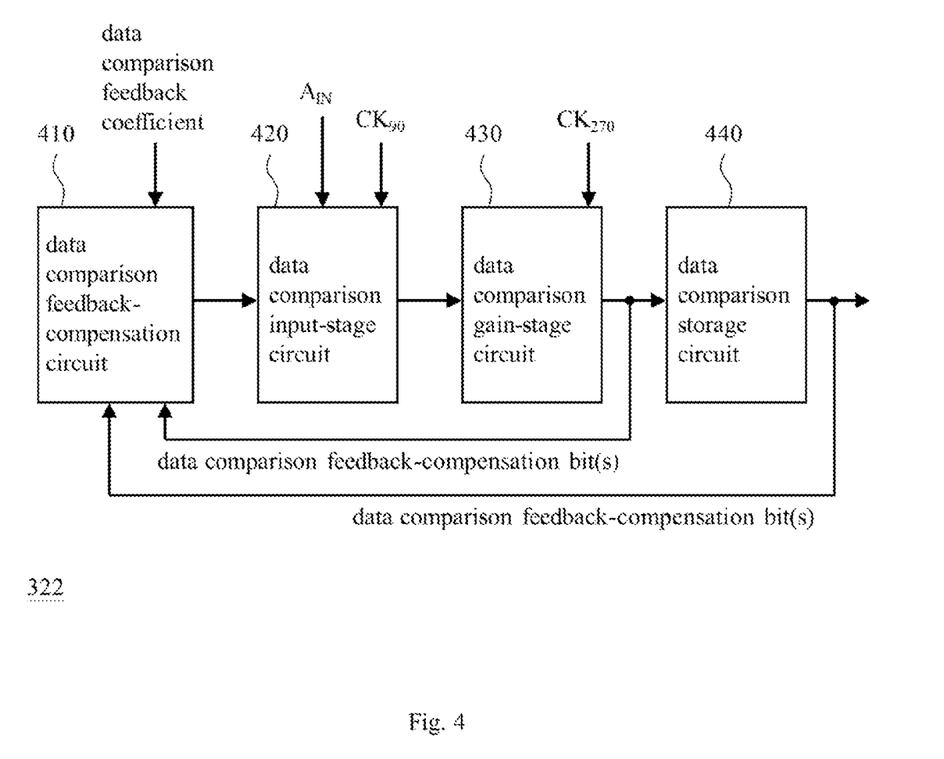
FIG. 4 shows an embodiment of each data comparator of FIG. 3.

For example: both the N and the N' are equal to two; one of the two data/amplitude/data-edge comparators 322/324/326 is used for processing the odd pieces of a signal (i.e., the $1^{st}$, the $3^{rd}$, ..., the $(2K-1)^{th}$ pieces of the signal, wherein the K is a positive integer) while the other one is used for processing the even pieces of the signal (i.e., the $2^{nd}$, the $4^{th}$, ..., the $2K^{th}$ pieces of the signal). An embodiment of each data comparator 322 is shown in FIG. 4, and includes a data comparison feedback-compensation circuit 410, a data comparison input-stage circuit 420, a data comparison gain-stage circuit 430, and a data comparison storage circuit 440 which are described in detail in later paragraphs. Provided an implementation is practicable, the N' amplitude comparator(s) 324 can be replaced with one or more known/self-developed amplitude comparator(s), the N data-edge comparator(s) 326 can be replaced with one or more known/self-developed data-edge comparator(s), and some or all of the above-mentioned comparators can be set outside the comparison device 320.

Figure 5:
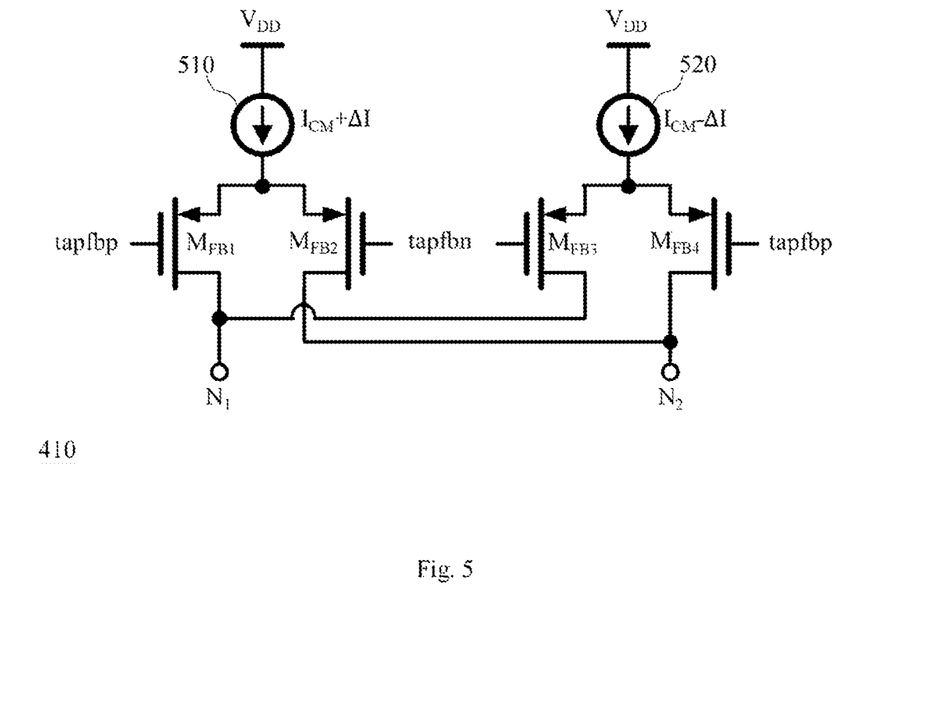
FIG. 5 shows an embodiment of the data comparison feedback-compensation circuit of FIG. 4.

Referring to FIG. 4, the data comparison feedback-compensation circuit 410 is configured to output a data comparison feedback-compensation signal to a first group of node(s) (e.g., $N_1$ and $N_2$ in FIG. 5) according to M data comparison feedback-compensation bit(s) (e.g., tapfbp and tapfbn in FIG. 5) and a data comparison feedback-compensation current (e.g., $\Delta I$ in FIG. 5), wherein the data comparison feedback-compensation current $\Delta I$ is dependent upon a data comparison feedback coefficient and the M is a positive integer denoting the total number of data feedback(s). For example, when M=2, the first group of node(s) include(s) two nodes which are two output nodes of a differential pair. FIG. 5 shows an embodiment of the data comparison feedback-compensation circuit 410. The embodiment of FIG. 5 is suitable for processing a differential signal, and includes a first current source 510, a second current source 520, a first transistor pair ($M_{FB1}$ and $M_{FB2}$), and a second transistor pair ($M_{FB3}$ and $M_{FB4}$). The first current source 510 is configured to output a first current ($I_{CM}+\Delta I$) which is equivalent to a sum of a predetermined current $I_{CM}$ and the data comparison feedback-compensation current $\Delta I$. The second current source 520 is configured to output a second current ($I_{CM}-\Delta I$) which is equivalent to a difference between the predetermined current $I_{CM}$ and the data comparison feedback-compensation current $\Delta I$. The first transistor pair ($M_{FB1}$ and $M_{FB2}$) is coupled with the first current source 510 and the first group of node(s) ($N_1$ and $N_2$), and is used for determining a part of the data comparison feedback-compensation signal according to the M data comparison feedback-compensation bit(s) (tapfbp and tapfbn). The second transistor pair ($M_{FB3}$ and $M_{FB4}$) is coupled with the second current source 520 and the first group of node(s) ($N_1$ and $N_2$), and is used for determining the other part of the data comparison feedback-compensation signal according to the M data comparison feedback-compensation bit(s) (tapfbp and tapfbn).

Figure 6:
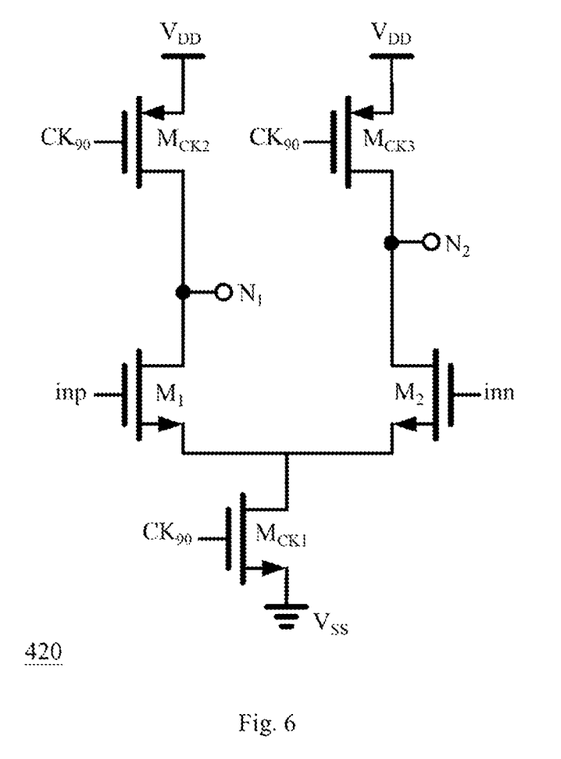
FIG. 6 shows an embodiment of the data comparison input-stage circuit of FIG. 4.

Referring to FIG. 4, the data comparison input-stage circuit 420 is configured to sample the analog input signal $A_{IN}$ (e.g., inp and inn in FIG. 6) under a control of a first clock $CK_{90}$ (e.g., $CK_{90}$ in FIG. 6) and thereby output a data comparison sampling signal (e.g., outputs of drains of the input transistor pair ($M_1$ and $M_2$) in FIG. 6) to the first group of node(s) (e.g., $N_1$ and $N_2$ in FIG. 6). Since the aforementioned data comparison feedback-compensation signal is also outputted to the first group of node(s) (e.g., $N_1$ and $N_2$ in FIGS. 5-6), the data comparison sampling signal is compensated by the data comparison feedback-compensation signal. FIG. 6 shows an embodiment of the data comparison input-stage circuit 420. The embodiment of FIG. 6 is suitable for processing a differential signal, and includes a high-voltage-terminal transistor pair ($M_{CK2}$ and $M_{CK3}$), an input transistor pair ($M_1$ and $M_2$), and a low-voltage-terminal transistor ($M_{CK1}$). The high-voltage-terminal transistor pair ($M_{CK2}$ and $M_{CK3}$) is set between a high voltage terminal $V_{DD}$ (e.g., a power supply terminal) and the first group of node(s) ($N_1$ and $N_2$), and is configured to operate according to the first clock $CK_{90}$. The input transistor pair ($M_1$ and $M_2$) is set between the first group of node(s) and the low-voltage-terminal transistor ($M_{CK1}$), and is configured to output the data comparison sampling signal to the first group of node(s) ($N_1$ and $N_2$) according to the analog input signal (inp and inn). The low-voltage-terminal transistor ($M_{CK1}$) is set between the input transistor pair ($M_1$ and $M_2$) and a low voltage terminal $V_{SS}$ (e.g., a ground terminal), and is configured to operate according to the first clock $CK_{90}$.

Figure 7:
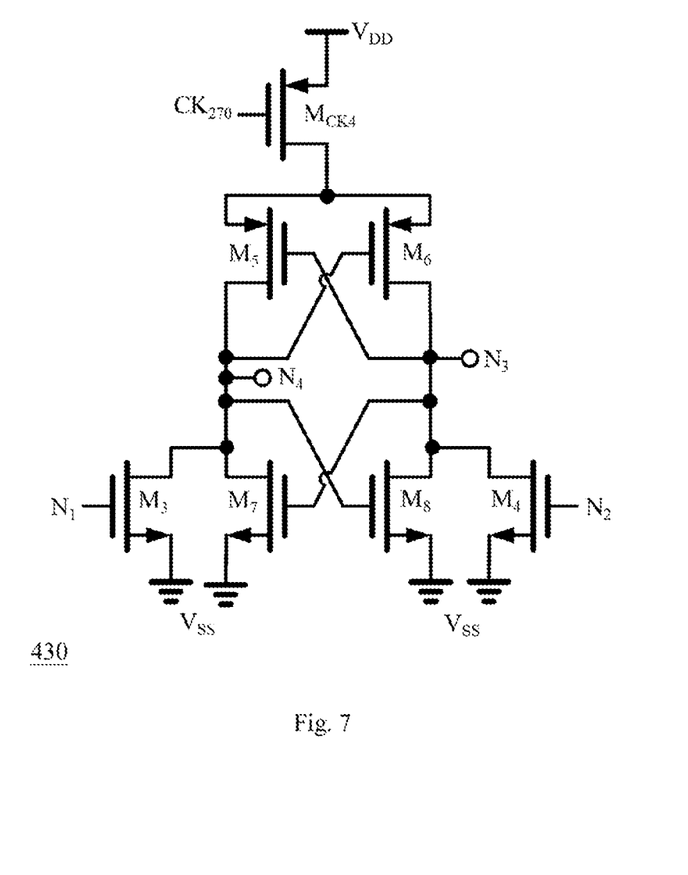
FIG. 7 shows an embodiment of the data comparison gain-stage circuit of FIG. 4.

Referring to FIG. 4, the data comparison gain-stage circuit 430 is configured to output a data comparison amplified signal to a second group of node(s) (e.g., $N_3$ and $N_4$ in FIG. 7) according to the signal(s) (i.e., the sum of the aforementioned data comparison feedback-compensation signal and the aforementioned data comparison sampling signal) of the first group of node(s) (e.g., $N_1$ and $N_2$ in FIGS. 5-7) under a control of a second clock $CK_{270}$, wherein the second clock $CK_{270}$ and the first clock $CK_{90}$ have the same frequency but different phases. For example, the phase of the second clock $CK_{270}$ is equal to the phase of the first clock $CK_{90}$ plus 180 degrees. FIG. 7 shows an embodiment of the data comparison gain-stage circuit 430. The embodiment of FIG. 7 is suitable for processing a differential signal, and includes a high-voltage-terminal transistor ($M_{CK4}$), a first transistor pair ($M_5$ and $M_6$), a second transistor pair ($M_7$ and $M_8$), and an input transistor pair ($M_3$ and $M_4$). The high-voltage-terminal transistor ($M_{CK4}$) is set between the high voltage terminal $V_{DD}$ and the first transistor pair ($M_5$ and $M_6$), and is configured to operate according to the second clock $CK_{270}$. The first transistor pair ($M_5$ and $M_6$) is set between the high-voltage-terminal transistor $M_{CK4}$ and the second group of node(s) ($N_3$ and $N_4$), and the second transistor pair ($M_7$ and $M_8$) is set between the second group of node(s) ($N_3$ and $N_4$) and the low voltage terminal $V_{SS}$. Based on the configuration of FIG. 7, when a voltage difference between the second group of node(s) (i.e., the voltage difference between the voltage at $N_3$ and the voltage at $N_4$) reaches a certain degree of difference (e.g., when the voltage difference exceeds a predetermined value), the first transistor pair ($M_5$ and $M_6$) will generate a positive feedback to the second transistor pair ($M_7$ and $M_8$) and thereby pull a swing of the signal (i.e., the above-mentioned data comparison amplified signal) of the second group of node(s) ($N_3$ and $N_4$) to a full swing. The input transistor pair ($M_3$ and $M_4$) is set between the second group of node(s) ($N_3$ and $N_4$) and the low voltage terminal $V_{SS}$, and the input transistor pair ($M_3$ and $M_4$) is configured to output an output signal to the second group of node(s) ($N_3$ and $N_4$) according to the signal(s) of the first group of node(s) ($N_1$ and $N_2$) and is further configured to separate the data comparison feedback-compensation circuit 410 from the data comparison gain-stage circuit 430 to prevent the aforementioned data comparison feedback-compensation signal from affecting a gain of the data comparison gain-stage circuit 430.

It is noted that since the data comparison feedback-compensation circuit 410 generates the data comparison feedback-compensation signal before this signal is amplified, the data comparison feedback-compensation circuit 410 can achieve a good compensation effect with a small current. In comparison with the prior art which makes compensation with a large current at an analog adder and suffers a bandwidth delay caused by the analog adder, the present embodiment only needs a very low current cost (or alternatively a power cost). In addition, since an operation duration of the analog adder 310 overlaps an operation duration of the data comparator 322 that is in charge of the main compensation, the total time used for accomplishing the whole compensation is shorter than that of the prior art. In an exemplary implementation: the main compensation includes the feedback compensation $D_{K-1} \times h_K$ for a $K^{th}$ piece of data $D_K$ (e.g., $D_1$); the feedback compensation $D_{K-1} \times h_K$ is equal to a product of a $(K-1)^{th}$ piece of data $D_{K-1}$ (e.g., $D_0$) and the $K^{th}$ piece of data $D_K$'s comparison feedback coefficient $h_K$; and the $(K-1)^{th}$ piece of data $D_{K-1}$ and the $K^{th}$ piece of data $D_K$ are two successive pieces of data among multiple pieces of data. In an exemplary implementation: the main compensation includes a first feedback compensation $D_{K-2} \times h_{K-1}$ and a second feedback compensation $D_{K-1} \times h_{K-2}$ for a $K^{th}$ piece of data $D_K$ (e.g., $D_3$); the first feedback compensation $D_{K-2} \times h_{K-1}$ is equal to a product of a $(K-2)^{th}$ piece of data $D_{K-2}$ (e.g., $D_1$) and a $(K-1)^{th}$ piece of data $D_{K-1}$'s comparison feedback coefficient $h_{K-1}$ (e.g., $h_2$); the second feedback compensation $D_{K-1} \times h_{K-2}$ is equal to a product of the $(K-1)^{th}$ piece of data $D_{K-1}$ (e.g., $D_2$) and a $(K-2)^{th}$ piece of data $D_{K-2}$'s comparison feedback coefficient $h_{K-2}$ (e.g., $h_1$); and the $(K-2)^{th}$ piece of data $D_{K-2}$, the $(K-1)^{th}$ piece of data $D_{K-1}$, and the $K^{th}$ piece of data $D_K$ are three successive pieces of data among multiple pieces of data. Normally, the compensation made based on earlier data is less important, but the present invention is not limited thereto. More exemplary implementations can be derived from the above description.

Referring to FIG. 4, the data comparison storage circuit 440 (e.g., an SR latch) is configured to output a data comparison result to a group of output node(s) (e.g., $O_1$ and $O_2$ in FIG. 8) according the signal(s) of the second group of node(s) (e.g., $N_3$ and $N_4$ in FIG. 7).

Referring to FIG. 3, the register 330 (e.g., a shift register) is coupled with the group of output node(s) (e.g., $O_1$ and $O_2$ in FIG. 8) and is configured to temporarily store the data comparison result. The decision feedback coefficient generator 340 is coupled with the register 330 and is configured to determine the aforementioned data comparison feedback coefficient and an analog-to-digital conversion feedback coefficient according to the data comparison result. The DAC 350 is coupled with the register 330 and the decision feedback coefficient generator 340, and is configured to convert the data comparison result into the aforementioned analog feedback signal $A_{FB}$ according to the analog-to-digital conversion feedback coefficient. It is noted that the analog-to-digital conversion feedback coefficient is generated based on earlier data, and thus its influence on the feedback compensation for the DFE 300 is minor. Accordingly, the analog adder 310 doesn't need to make significant compensation with a large current. The decision feedback coefficient generator 340 and the algorithm for the generator 340 to generate coefficients can be realized with known/self-developed technologies which fall beyond the scope of the present disclosure. The DAC 350 can be realized with known/self-developed technologies which fall beyond the scope of the present disclosure.

Figure 8:
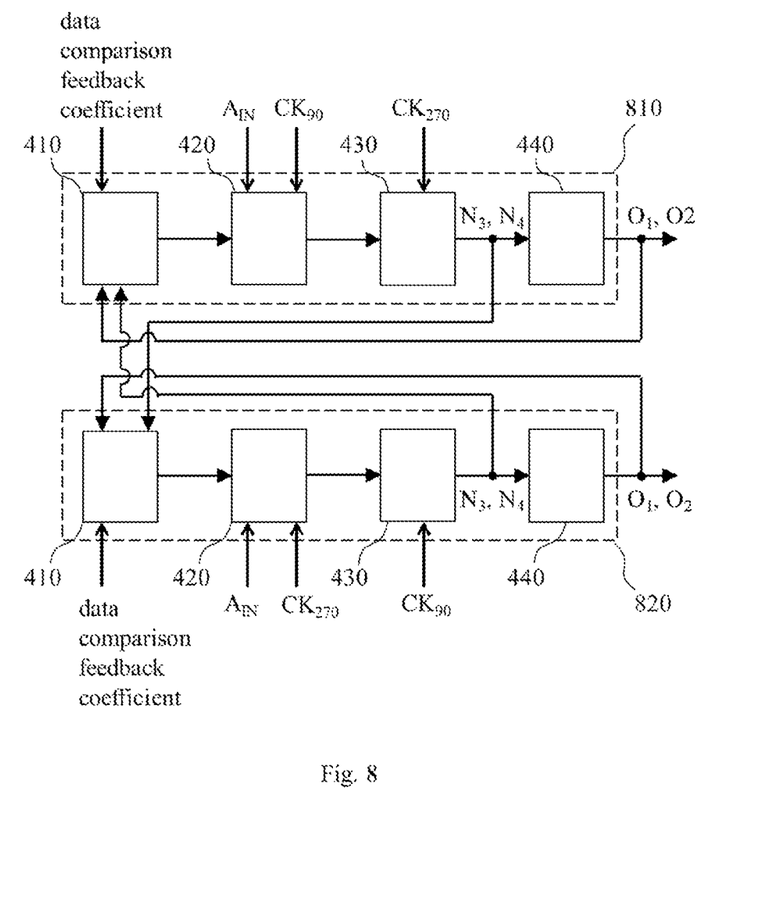
FIG. 8 shows an exemplary implementation of the N data comparator(s) of FIG. 3 including a first data comparator and a second data comparator.

Referring to FIG. 3, the number of the data comparator(s) "N" can be greater than one as mentioned in the preceding paragraph. When the N is greater than one, the N data comparators 322 process the analog input signal $A_{IN}$ in a time-division multiplexing manner to enhance the whole quality of the output signals of the N data comparators 322; in the meantime, a frequency of an operation clock (e.g., each of the first clock $CK_{90}$ and the second clock $CK_{270}$) for each data comparator 322 is one-$N^{th}$ of the frequency of the analog input signal $A_{IN}$, which is just an example and is usually determined according to the time-division multiplexing manner. FIG. 8 shows an exemplary implementation of the N data comparators 322 including a first data comparator 810 and a second data comparator 820. An embodiment of each of the two data comparators 810, 820 is illustrated with FIGS. 4~7. Referring to FIG. 4~8, in an exemplary implementation, when the first data comparator 810 receives a $K^{th}$ piece of data $D_K$ of the analog input signal $A_{IN}$, the first data comparator 810 compensates for the first piece of data $D_K$ according to the aforementioned M data comparison feedback-compensation bit(s) (e.g., tapfbp and tapfbn in FIG. 5), wherein the first piece of the M data comparison feedback-compensation bit(s) originates from "the signal(s) of the second group of node(s) ($N_3$ and $N_4$) of the second data comparator 820" (i.e., the signal(s) generated according to a $(K-1)^{th}$ piece of data $D_{K-1}$ of the analog input signal $A_{IN}$), and the second piece of the M data comparison feedback-compensation bit(s) originates from "the signal(s) of the output node(s) ($O_1$ and $O_2$) of the first data comparator 810" (i.e., the signal(s) generated according to a $(K-2)^{th}$ piece of data $D_{K-2}$ of the analog input signal $A_{IN}$). In the similar manner, when the second data comparator 820 receives a $(K+1)^{th}$ piece of data $D_{K+1}$ of the analog input signal $A_{IN}$, the second data comparator 820 compensates for the second piece of data $D_{K+1}$ according to the M data comparison feedback-compensation bit(s) (e.g., tapfbp and tapfbn in FIG. 5), wherein the first piece of the M data comparison feedback-compensation bit(s) originates from "the signal(s) of the second group of node(s) ($N_3$ and $N_4$) of the first data comparator 810" (i.e., the signal(s) generated according to a $K^{th}$ piece of data $D_K$ of the analog input signal $A_{IN}$), and the second piece of the M data comparison feedback-compensation bit(s) originates from "the signal(s) of the output node(s) ($O_1$ and $O_2$) of the second data comparator 820" (i.e., the signal(s) generated according to a $(K-1)^{th}$ piece of data $D_{K-1}$ of the analog input signal $A_{IN}$). The determination of the other pieces of the M data comparison feedback-compensation bit(s) can be derived from the above description. It is noted that the M data comparison feedback-compensation bit(s) may originate in another manner, if practicable.

Referring to FIGS. 4-8, FIG. 8 especially, when the N is two, the first data comparator 810 is used for processing the odd pieces of the analog input signal $A_{IN}$ while the second data comparator 820 is used for processing the even pieces of the analog input signal $A_{IN}$. Consequently, a phase difference between operation clocks for the first data comparator 810 and the operation clock for the second data comparator 820 exists. More specifically, "a phase of the first clock $CK_{90}$ for the first data comparator 810" is equal to "a phase of the first clock $CK_{90}$ for the second data comparator 820 minus 180 degrees". When the N is greater than two (e.g., N=4), those having ordinary skill in the art can appreciate how to determine the phase differences between the operation clocks for the N data comparators 322 in accordance with the N.

Referring to FIG. 3, an embodiment of each of the N' amplitude comparator(s) 324 includes: an amplitude comparison feedback-compensation circuit (e.g., a circuit identical to the data comparison feedback-compensation circuit 410 of FIG. 5) configured to output an amplitude comparison feedback-compensation signal to a group of node(s) (e.g., $N_1$ and $N_2$ in FIG. 5) according to M amplitude comparison feedback-compensation bit(s) (e.g., tapfbp and tapfbn in FIG. 5) and an amplitude comparison feedback-compensation current $\Delta I$ (e.g., $\Delta I$ in FIG. 5), wherein the amplitude comparison feedback-compensation current $\Delta I$ is dependent upon the aforementioned data comparison feedback coefficient; an amplitude comparison input-stage circuit (e.g., the amplitude comparison input-stage circuit 910 in FIG. 9) configured to output an amplitude comparison input signal to the group of node(s) (e.g., $N_1$ and $N_2$ in FIG. 9) according to the analog input signal $A_{IN}$ and a threshold signal $V_{TH}$ under the control of the first clock $CK_{90}$; an amplitude comparison gain-stage circuit (e.g., a circuit identical to the data comparison gain-stage circuit 430 in FIG. 7) configured to output an amplitude comparison amplified signal to another group of node(s) (e.g., $N_3$ and $N_4$ in FIG. 7) according to the signal(s) of the group of node(s) (e.g., $N_1$ and $N_2$ in FIG. 7 and FIG. 9) under the control of the second clock $CK_{270}$; and an amplitude comparison storage circuit (e.g., a circuit identical to the data comparison storage circuit 440 in FIG. 4) configured to output an amplitude comparison result to a group of output node(s) (e.g., the aforementioned $O_1$ and $O_2$) according the signal(s) of the another group of node(s) (e.g., $N_3$ and $N_4$ in FIG. 7).

It is noted that the compensation made by the amplitude comparator(s) 324 and the compensation made by the data comparator(s) 322 are based on the same information. Accordingly, when the N' amplitude comparator(s) 324 include(s) a first amplitude comparator and a second amplitude comparator, the source of the M amplitude comparison feedback-compensation bit(s) for the first amplitude comparator is identical to the source of the M data comparison feedback-compensation bit(s) (See FIG. 4) for the first data comparator 810 of FIG. 8, and the source of the M amplitude comparison feedback-compensation bit(s) for the second amplitude comparator is identical to the source of the M data comparison feedback-compensation bit(s) (See FIG. 4) for the second data comparator 820 of FIG. 8. The M amplitude comparison feedback-compensation bit(s) may originate in another manner, if practicable.

Figure 9:
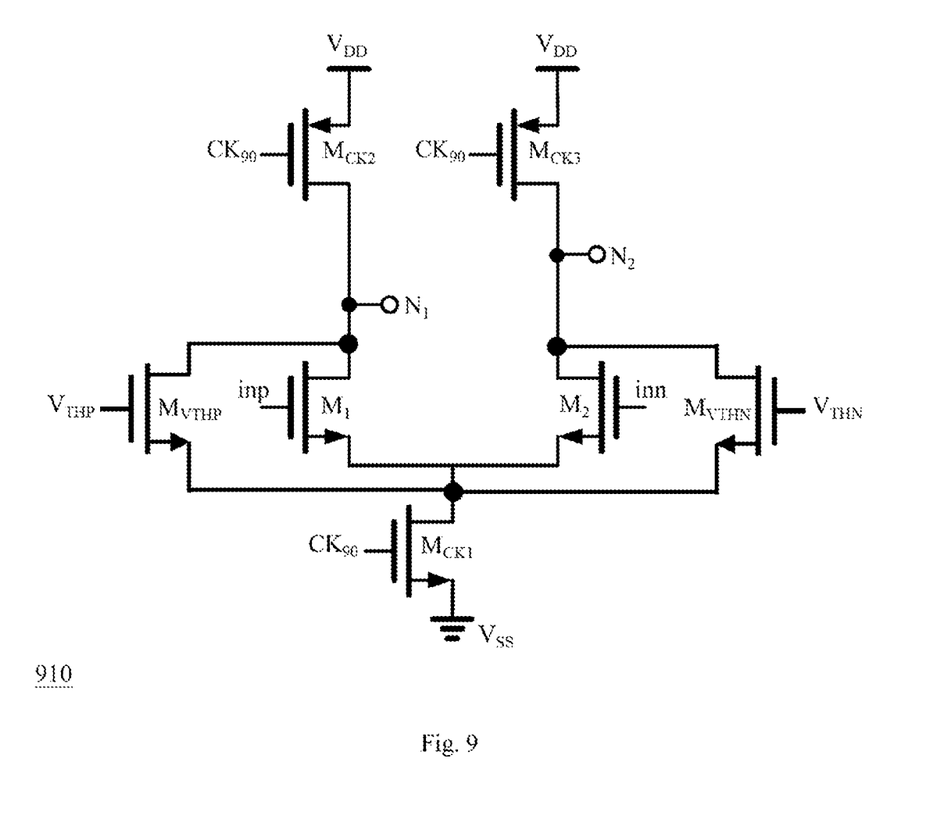
FIG. 9 shows an embodiment of the amplitude comparison input-stage circuit of any of the N' amplitude comparator(s) of FIG. 3.

FIG. 9 shows an embodiment of the amplitude comparison input-stage circuit. This embodiment is suitable for processing a differential signal. In comparison with the data comparison input-stage circuit 420 in FIG. 6, the amplitude comparison input-stage circuit 910 of FIG. 9 further includes an amplitude threshold transistor pair ($M_{VTHP}$ and $M_{VTHN}$). The amplitude threshold transistor pair ($M_{VTHP}$ and $M_{VTHN}$) is set between the group of node(s) ($N_1$ and $N_2$) and the low-voltage-terminal transistor ($M_{CK1}$), and is configured to output a part of the amplitude comparison input signal to the group of node(s) ($N_1$ and $N_2$) according to the threshold signal $V_{TH}$ composed of two signals ($V_{THP}$ and $V_{THN}$). The transistors ($M_1$ and $M_2$) output the other part of the amplitude comparison input signal according to the analog input signal (inp and inn). Regarding the above embodiment, the threshold signal $V_{TH}$ (i.e., $V_{THP}$ and $V_{THN}$) can be determined according to implementation needs, and is used for making the centers of the amplitudes of the signals inputted to the data comparator 322 and the amplitude comparator 324 converge toward $V_{TH}$.

Since those having ordinary skill in the art can refer to the disclosure of the embodiments of FIGS. 4~9 to appreciate the details and the modifications of the N' amplitude comparator(s) 324, repeated and redundant description is omitted here.

Referring to FIG. 3, each of the N data-edge comparator(s) 326 includes: a data-edge comparison feedback-compensation circuit (e.g., a circuit identical to the data comparison feedback-compensation circuit 410 of FIG. 5) configured to output a data-edge comparison feedback-compensation signal to a group of node(s) (e.g., $N_1$ and $N_2$ in FIG. 5) according to M data-edge comparison feedback-compensation bit(s) (e.g., tapfbp and tapfbn in FIG. 5) and a data-edge comparison feedback-compensation current $\Delta I$ (e.g., $\Delta I$ in FIG. 5), wherein the data-edge comparison feedback-compensation current $\Delta I$ is dependent upon a data-edge comparison feedback coefficient; a data-edge comparison input-stage circuit (e.g., a circuit identical to the data comparison input-stage circuit 420 in FIG. 6) configured to output a data-edge comparison input signal to the group of node(s) (e.g., $N_1$ and $N_2$ in FIG. 6) according to the analog input signal (e.g., inp and inn in FIG. 6) under a control of a third clock $CK_0$, wherein the third clock $CK_0$ takes the place of the first clock $CK_{90}$ of FIG. 6 (e.g., the third clock $CK_0$ having a phase equal to "the phase of the first clock $CK_{90}$ minus 90 degrees") and is used for the data-edge comparison; a data-edge comparison gain-stage circuit (e.g., a circuit identical to the data comparison gain-stage circuit 430 in FIG. 7) configured to output a data-edge comparison amplified signal to another group of node(s) (e.g., $N_3$ and $N_4$ in FIG. 7) according to the signal(s) of the group of node(s) (e.g., $N_1$ and $N_2$ in FIG. 7) under a control of a fourth clock $CK_{180}$, wherein the fourth clock $CK_{180}$ takes the place of the second clock $CK_{270}$ of FIG. 7 (e.g., the fourth clock $CK_{180}$ having a phase equal to "the phase of the second clock $CK_{270}$ minus 90 degrees") and is used for the data-edge comparison; and a data-edge comparison storage circuit (e.g., a circuit identical to the data comparison storage circuit 440 in FIG. 4) configured to output a data-edge comparison result to a group of output node(s) (e.g., the aforementioned $O_1$ and $O_2$) according the signal(s) of the second group of node(s) (e.g., $N_3$ and $N_4$ in FIG. 7).

It is noted that the decision feedback coefficient generator 340 is configured to determine the data-edge comparison feedback coefficient according to the data-edge comparison result, and the data-edge comparison feedback coefficient and the aforementioned data comparison feedback coefficient can be determined separately. The decision feedback coefficient generator 340 itself and the algorithm the generator 340 uses to generate coefficients can be realized with known/self-developed technologies. In addition, the compensation made by the data-edge comparator(s) 326 and the compensation made by the data comparator(s) 322 are based on the same information; however, the first piece of the M data comparison feedback-compensation bit(s) for the data comparator(s) 322 will cause a phase shift to the data edge, and thus when the N data-edge comparator(s) 326 include(s) a first data-edge comparator and a second data-edge comparator, the source of the first piece of the M amplitude data-edge feedback-compensation bit(s) for the first data-edge comparator is identical to the source of the second piece of the M data comparison feedback-compensation bit(s) (See FIG. 4) for the first data comparator 810 of FIG. 8, and the source of the first piece of the M amplitude data-edge feedback-compensation bit(s) for the second data-edge comparator is identical to the source of the second piece of the M data comparison feedback-compensation bit(s) (See FIG. 4) for the second data comparator 820 of FIG. 8. The M data-edge comparison feedback-compensation bit(s) may originate in another manner, if practicable.

Since those having ordinary skill in the art can refer to the embodiments of FIGS. 4~8 to appreciate the details and the modifications of the N data-edge comparator(s) 326, repeated and redundant description is omitted here.

Figure 10:
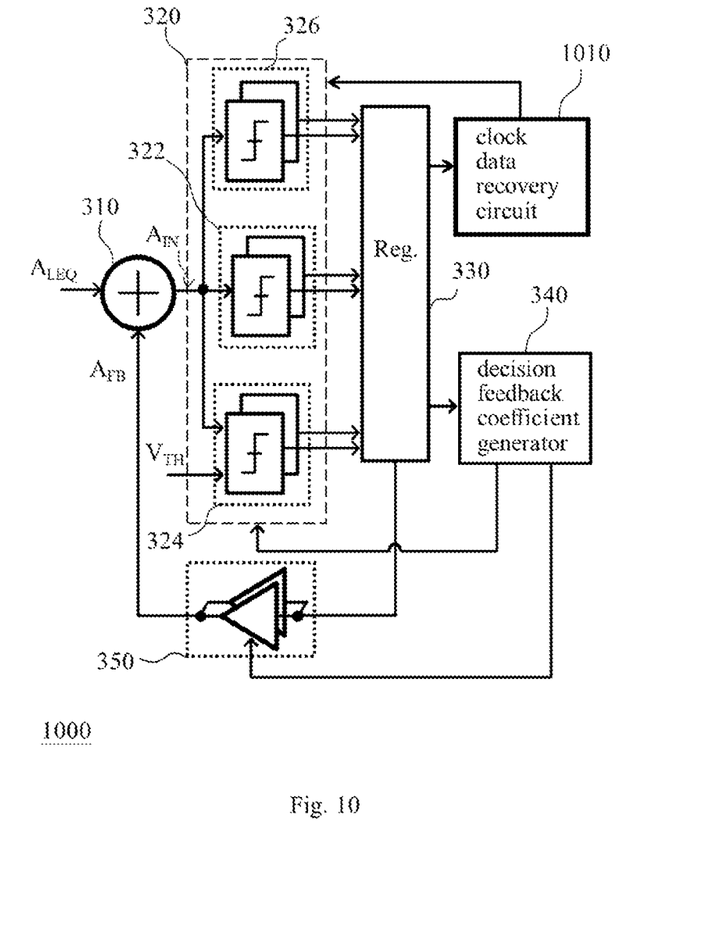
FIG. 10 shows an embodiment of the decision feedback equalizer of the present disclosure.

FIG. 10 shows another embodiment of the DFE of the present disclosure. Compared with the DFE 300 of FIG. 3, The DFE 1000 of FIG. 10 further includes: a clock and data recovery (CDR) circuit 1010 configured to control the phase of the first clock $CK_{90}$, the phase of the second clock $CK_{270}$, the phase of the third clock $CK_0$, and the phase of the fourth clock $CK_{180}$ according to the data-edge comparison result. The CDR 1010 can be realized with known/self-developed technologies and falls beyond the scope of the present disclosure.

It is noted that people having ordinary skill in the art can selectively use some or all of the features of any embodiment in this specification or selectively use some or all of the features of multiple embodiments in this specification to implement the present invention as long as such implementation is practicable. In other words, the way to implement the present invention is flexible based on the present disclosure.

To sum up, the decision feedback equalizer of the present disclosure includes at least one of the following features: allowing an analog addition operation and a data comparison operation to be performed simultaneously and thereby relaxing limitation on time of the provision of a first piece of feedback data; avoiding using an analog adder of high power consumption; using a small current to perform feedback compensation; and optimizing feedback coefficient(s) for a data comparator and the feedback coefficient(s) for a data-edge comparator, respectively.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A decision feedback equalizer (DFE), comprising:
an analog adder configured to generate an analog input signal according to an analog received signal and an analog feedback signal;
a comparison device including:
N data comparator(s), wherein the N is a positive integer, and each of the N data comparator(s) includes:
a data comparison feedback-compensation circuit configured to output a data comparison feedback-compensation signal to a first group of node(s) according to M data comparison feedback-compensation bit(s) and a data comparison feedback-compensation current, wherein the M is a positive integer, and the data comparison feedback-compensation current is dependent upon a data comparison feedback coefficient;
a data comparison input-stage circuit configured to output a data comparison sampling signal to the first group of node(s) according to the analog input signal under control of a first clock;
a data comparison gain-stage circuit configured to output a data comparison amplified signal to a second group of node(s) according to signal(s) of the first group of node(s) under control of a second clock, wherein the second clock and the first clock have the same frequency but different phases; and
a data comparison storage circuit configured to output a data comparison result according to signal(s) of the second group of node(s);
a register coupled with the comparison device, and configured to temporarily store the data comparison result;
a decision feedback coefficient generator coupled with the register, and configured to determine the data comparison feedback coefficient and an analog-to-digital conversion feedback coefficient according to the data comparison result; and
a digital-to-analog converter coupled with the decision feedback coefficient generator and the register, and configured to convert the data comparison result into the analog feedback signal according to the analog-to-digital conversion feedback coefficient.

2. The DFE of claim 1, wherein the N is greater than one; the N data comparators include a first data comparator and a second data comparator; a first piece of the M data comparison feedback-compensation bit(s) for the first data comparator originates from the signal(s) of the second group of node(s) of the second data comparator, and a second piece of the M data comparison feedback-compensation bit(s) for the first data comparator originates from the data comparison result of the first data comparator; a first piece of the M data comparison feedback-compensation bit(s) for the second data comparator originates from the signal(s) of the second group of node(s) of the first data comparator, and a second piece of the M data comparison feedback-compensation bit(s) for the second data comparator originates from the data comparison result of the second data comparator.

3. The DFE of claim 2, wherein the N is equal to two; each of the first data comparator and the second data comparator has a first component and a second component; the first clock connects to the first component of the first data comparator and the second component of the second data comparator; and the second clock connects to the second component of the first data comparator and the first component of the second data comparator.

4. The DFE of claim 1, wherein the analog input signal is a differential signal, and the M is equal to two.

5. The DFE of claim 4, wherein the data comparison feedback-compensation circuit includes:
   a first current source configured to output a first current, wherein the first current is equal to a sum of a predetermined current and the data comparison feedback-compensation current;
   a second current source configured to output a second current, wherein the second current is equal to a difference between the predetermined current and the data comparison feedback-compensation current;
   a first transistor pair coupled with the first current source and the first group of node(s), and configured to determine a part of the data comparison feedback-compensation signal according to the M data comparison feedback-compensation bit(s); and
   a second transistor pair coupled with the second current source and the first group of node(s), and configured to determine the other part of the data comparison feedback-compensation signal according to the M data comparison feedback-compensation bit(s).

6. The DFE of claim 4, wherein the data comparison input-stage circuit includes a high-voltage-terminal transistor pair, an input transistor pair, and a low-voltage-terminal transistor, wherein:
   the high-voltage-terminal transistor pair is set between a high voltage terminal and the first group of node(s), and is configured to operate according to the first clock;
   the input transistor pair is set between the first group of node(s) and the low-voltage-terminal transistor, and is configured to output the data comparison sampling signal to the first group of node(s) according to the analog input signal; and
   the low-voltage-terminal transistor is set between the input transistor pair and a low voltage terminal, and is configured to operate according to the first clock.

7. The DFE of claim 4, wherein the data comparison gain-stage circuit includes a high-voltage-terminal transistor, a first transistor pair, a second transistor pair, and an input transistor pair, wherein:
   the high-voltage-terminal transistor pair is set between a high voltage terminal and the first group of node(s), and is configured to operate according to the second clock;
   the first transistor pair is set between the high-voltage-terminal transistor and the second group of node(s), and is configured to control a swing of the signal(s) of the second group of node(s);
   the second transistor pair is set between the second group of node(s) and a low voltage terminal, and is configured to control the swing of the signal(s) of the second group of node(s); and
   the input transistor pair is set between the second group of node(s) and the low voltage terminal, and is configured to output an output signal to the second group of node(s) according to the signal(s) of the first group of node(s).

8. The DFE of claim 1, wherein the comparison device further includes:

N' amplitude comparator(s), wherein the N' is a positive integer, the N' is smaller than or equal to the N, and each of the N' amplitude comparator(s) includes:
   an amplitude comparison feedback-compensation circuit configured to output an amplitude comparison feedback-compensation signal to a third group of node(s) according to M amplitude comparison feedback-compensation bit(s) and an amplitude comparison feedback-compensation current, wherein the amplitude comparison feedback-compensation current is dependent upon the data comparison feedback coefficient;
   an amplitude comparison input-stage circuit configured to output an amplitude comparison input signal to the third group of node(s) according to the analog input signal and a threshold signal under the control of the first clock;
   an amplitude comparison gain-stage circuit configured to output an amplitude comparison amplified signal to a fourth group of node(s) according to signal(s) of the third group of node(s) under the control of the second clock; and
   an amplitude comparison storage circuit configured to output an amplitude comparison result to the register according signal(s) of the fourth group of node(s),
wherein the decision feedback coefficient generator is further configured to determine the data comparison feedback coefficient according to the amplitude comparison result.

9. The DFE of claim 1, wherein the comparison device further includes:
N data-edge comparator(s), wherein each of the N data-edge comparator(s) includes:
   a data-edge comparison feedback-compensation circuit configured to output a data-edge comparison feedback-compensation signal to a third group of node(s) according to M data-edge comparison feedback-compensation bit(s) and a data-edge comparison feedback-compensation current, wherein the data-edge comparison feedback-compensation current is dependent upon a data-edge comparison feedback coefficient;
   a data-edge comparison input-stage circuit configured to output a data-edge comparison input signal to the third group of node(s) according to the analog input signal under control of a third clock;
   a data-edge comparison gain-stage circuit configured to output a data-edge comparison amplified signal to a fourth group of node(s) according to signal(s) of the third group of node(s) under control of a fourth clock, wherein the first clock, the second clock, the third clock, and the fourth clock have the same frequency but different phases; and
   a data-edge comparison storage circuit configured to output a data-edge comparison result to the register according signal(s) of the fourth group of node(s),
wherein the decision feedback coefficient generator is further configured to determine the data-edge comparison feedback coefficient according to the data-edge comparison result.

10. The DFE of claim 9, further comprising:
a clock and data recovery (CDR) circuit configured to control a phase of the first clock, a phase of the second clock, a phase of the third clock, and a phase of the fourth clock according to the data-edge comparison result.

* * * * *